(12) United States Patent
Maruyama (10) Patent No.: US 6,982,408 B2
(45) Date of Patent: Jan. 3, 2006

(54) PHOTO-DETECTING METHOD AND PHOTO-DETECTING DEVICE WITH VARYING MODULATION FREQUENCY

(75) Inventor: Yasuhiro Maruyama, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 239 days.

(21) Appl. No.: 10/317,187

(22) Filed: Dec. 12, 2002

(65) Prior Publication Data

US 2003/0127586 A1   Jul. 10, 2003

(30) Foreign Application Priority Data

Dec. 14, 2001 (JP) .............................. 2001-382083
Dec. 10, 2002 (JP) .............................. 2002-358438

(51) Int. Cl.
   *G06M 7/00* (2006.01)
   *H01J 40/14* (2006.01)
(52) U.S. Cl. .................... 250/221; 250/221.1; 340/556
(58) Field of Classification Search ................ 250/221, 250/214, 574, 336.1, 222, 222.1; 356/4.1, 356/5.1; 340/556
   See application file for complete search history.

(56) References Cited

U.S. PATENT DOCUMENTS 5,099,113 A * 3/1992 Oi ........................... 250/214 B 5,243,182 A * 9/1993 Murata ..................... 250/222.1
6,429,635 B2 * 8/2002 Okubo ........................ 323/282

FOREIGN PATENT DOCUMENTS

JP      04-147085      5/1992
JP      06-187884      7/1994

* cited by examiner

*Primary Examiner*—David Porta
*Assistant Examiner*—Tony Ko
(74) *Attorney, Agent, or Firm*—Birch, Stewart, Kolasch & Birch, LLP (57) ABSTRACT

A photo-detecting method of the present invention includes the steps of projecting from a light emitting element a pulse-modulated light as pulse-modulated at a light-emitting element drive circuit toward an object; and counting a light-receiving signal, which is converted by the light-emitting element based on either reflected light reflected from the object or transmitted light transmitted through the object, plurality of times in synchronism with a modulation frequency of the pulse-modulated light projected toward the object, so as to detect the object, wherein the modulation frequency of the pulse-modulated light projected toward the object is changed while carrying out the step of counting the light-receiving signal plurality of times. With this method, it is possible to prevent faulty operation when disturbance light or noise enters the light-receiving element without the light-receiving signal.

9 Claims, 6 Drawing Sheets

PHOTO-DETECTING METHOD AND PHOTO-DETECTING DEVICE WITH VARYING MODULATION FREQUENCY

FIELD OF THE INVENTION

The present invention relates to a photo-detecting method and a photo-detecting device, such as a photoelectric switch and a photo-interrupter, for example, which detect an object by projecting pulse-modulated light from a light-emitting element.

BACKGROUND OF THE INVENTION

Figure 4:
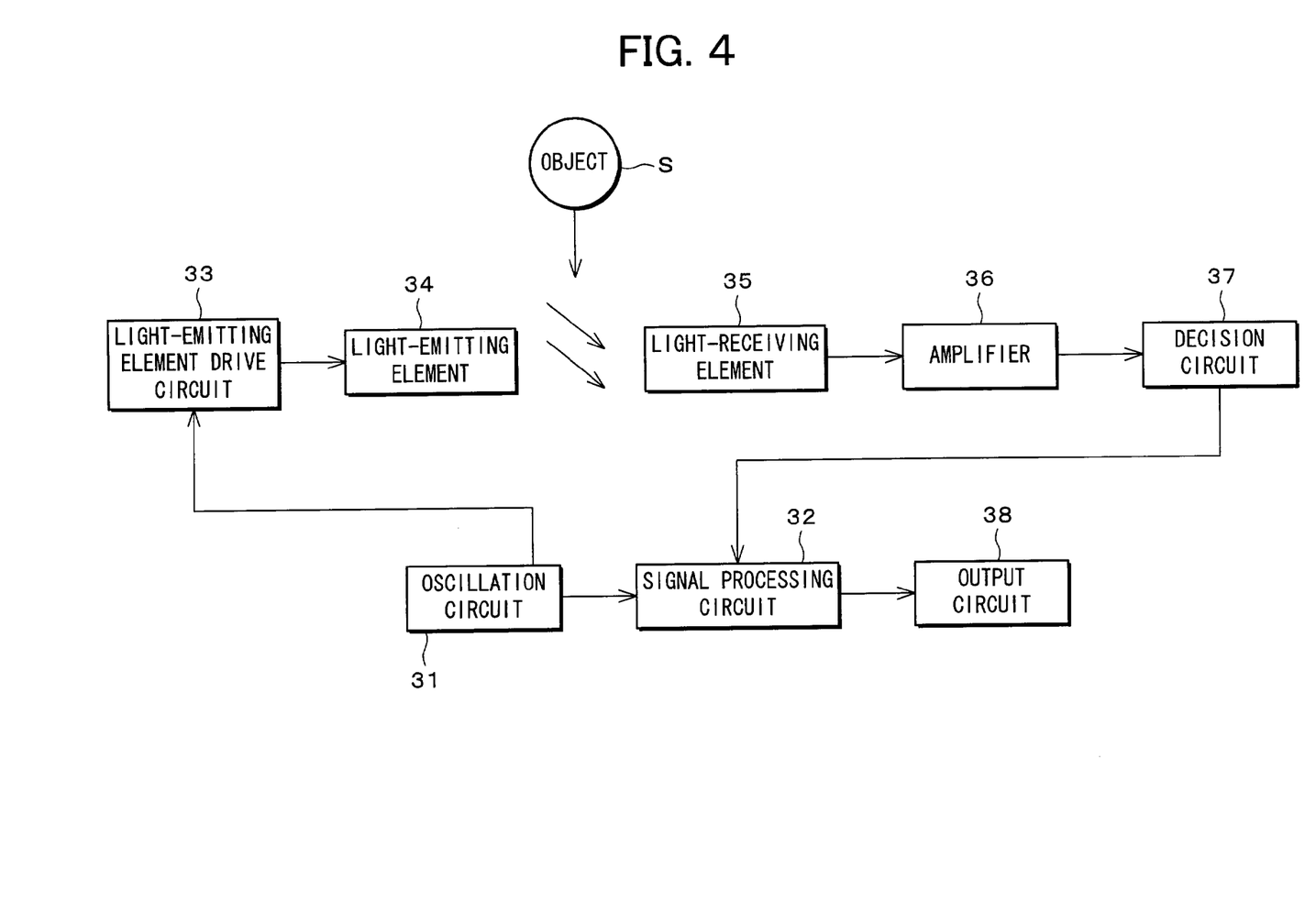
FIG. 4 is a block diagram showing an example of an arrangement of a conventional photo-detecting device.

An example of an overall arrangement of a conventional light-modulating detecting device will be schematically explained with reference to FIGS. 4 and 5. As shown in FIG. 4, a light-emitting element 34 is driven to perform pulse-modulation through an oscillation circuit 31 and a light-emitting element drive circuit 33. The light-emitting element 34 projects pulse-modulated pulse light toward an object S that exists in a detection area (not shown).

The pulse-modulated pulse light is transmitted through or is reflected from the object S that passes through the detection area provided between the light-emitting element 34 and a light-receiving element 35, so as to enter the light-receiving element 35. In other words, the pulse light for entering the light-receiving element 35 is set ON and OFF in response to the passing of the object S.

An optical signal, which is an output of the light-receiving element 35, is subjected to amplification and waveform shaping by an amplifier 36, and is then sent to a decision circuit 37. The output of the decision circuit 37 is sent to a signal processing circuit 32.

Figure 5:
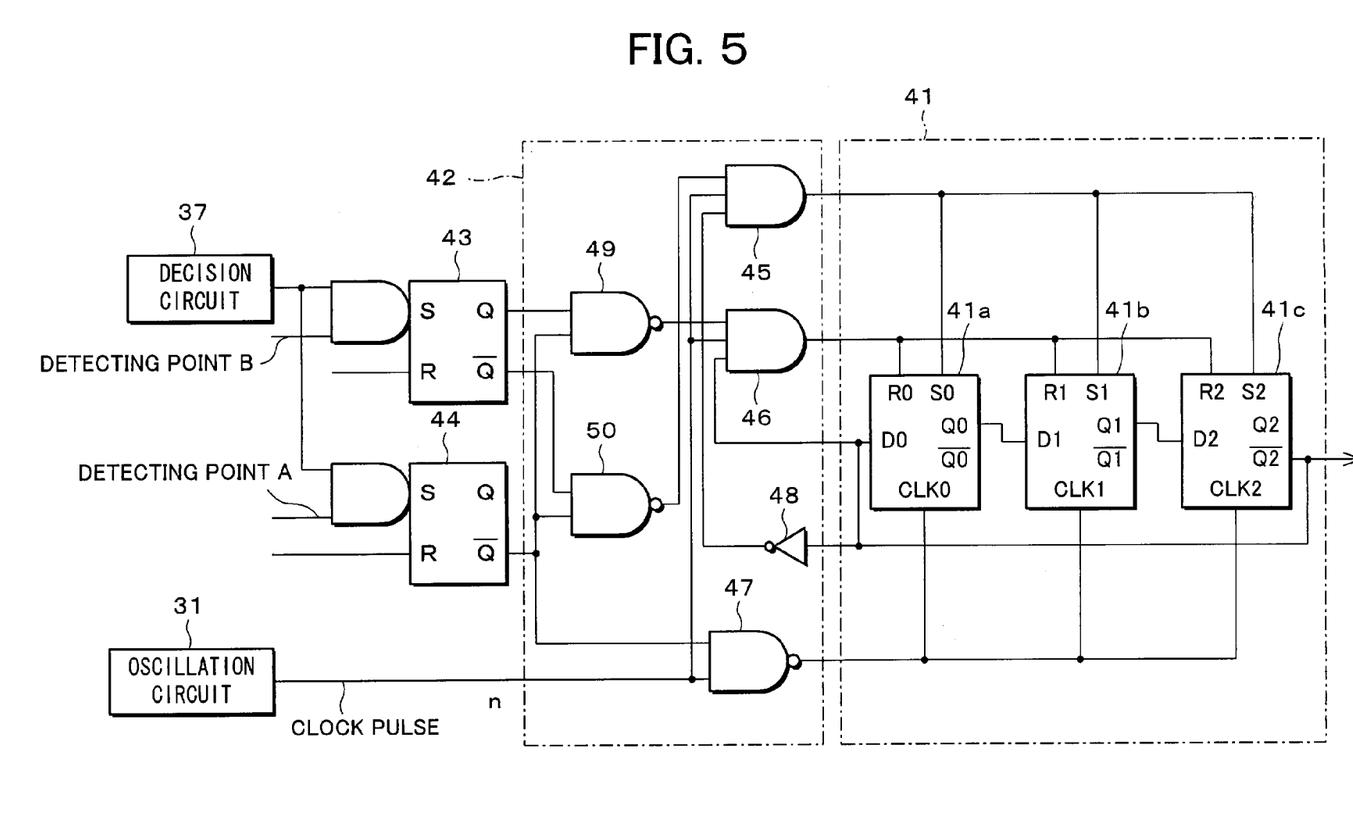
FIG. 5 is a circuit diagram showing an example of an arrangement of a signal processing circuit of the conventional photo-detecting device.

As shown in FIG. 5, the signal processing circuit 2 is composed of (a) R-S flip-flops 43 and 44, respectively attached with a timing gate, for capturing data at output detecting points A and B of the decision circuit 37 and for holding the data (hereinafter simply referred to as R-S flip-flops 43 and 44), (b) a shift register 41, which is arranged to feedback an inversion signal from serial output to serial input so as to shift the supplied input data in accordance with clock pulse having a predetermined cycle, and (c) a state detecting circuit 42. The state detecting circuit 42 is composed of (a) AND gates 45 and 46 for controlling the shift register 41 to be set and reset in response to (1) output of the shift register 41 (an output signal from an inverting output terminal /Q2 of a D flip-flop 41c as later described), (2) the clock pulse, and (3) a signal from output terminals (Q, /Q) of the R-S flip-flop 43 which holds the data captured at the detecting point B, and (b) an NAND gate 47, supplied with (1) output of the R-S flip-flop 44 which holds the data captured at the detecting point A and (2) the clock pulse, for controlling supply of the clock pulse into the shift register 41.

More specifically, an output terminal Q0 of the D flip-flop 41a is connected to a data input terminal D1 of the D flip-flop 41b, and an output terminal Q1 of the D flip-flop 41b is connected to a data input terminal D2 of the D flip-flop 41c. The inverting output terminal /Q2 of the D flip-flop 41c is connected to a data input terminal D0 of the D flip-flop 41a. Further, reset terminals R0 through R2 of the D flip-flops 41a through 41c are respectively connected to an output terminal of the AND gate 46 as later described. Set terminals S0 through S2 of the D flip-flops 41a through 41c are respectively connected to an output terminal of the AND gate 45 as later described. Clock input terminals CLK0 through CLK2 of the D flip-flops 41a through 41c are respectively connected to an output terminal of the NAND gate 47 as later described.

The signal processing circuit 32 is further provided with the state detecting circuit 42. The state detecting circuit 42 is composed of the AND gates 45 and 46, an inverter gate 48, and three NAND gates 47, 49, and 50 (respectively having two inputs).

The output signal of the inverting output terminal /Q2 of the D flip-flop 41c is sent to an input terminal (first input terminal) of the AND gate 45 via the inverter gate 48. The inverting output terminal /Q2 of the D flip-flop 41c is also connected to an input terminal (first input terminal) of the AND gate 46. The clock pulse is respectively supplied to input terminals (second input terminals) of the AND gates 45 and 46. An output terminal of the NAND gate 49 is connected to the remaining input terminal (third input terminal) of the AND gate 46, whereas an output terminal of the NAND gate 50 is connected to the remaining input terminal (third input terminal) of the AND gate 45.

An input terminal of the NAND gate 47 is applied with the clock pulse that varies in accordance with the output of the oscillation circuit 31. Another input terminal of the NAND gate 47 is connected to the inverting output terminal /Q of the R-S flip-flop 44.

The NAND gate 50 has one input terminal connected to the inverting output terminal /Q of the R-S flip-flop 44, and another input terminal connected to the inverting output terminal /Q of the R-S flip-flop 43. Further, the NAND gate 49 has one input terminal connected to the output terminal Q of the R-S flip-flop 43, and another input terminal connected to the inverting output terminal /Q of the R-S flip-flop 44.

According to the above-described circuit configuration, when the output of the decision circuit 37 (receiving signal) is at the high level at the detecting point A (non-light-emitting timing) (i.e., the disturbance light noise exists), the R-S flip-flop 44 is set, so that the inverting output terminal /Q of the R-S flip-flop 44 constantly supplies a low-level signal to the input terminal of the NAND gate 47. Accordingly, irrespectively of the clock pulse, the output terminal of the NAND gate 47 constantly supplies a high-level signal to the respective clock input terminals CLK0 through CLK2 of the D flip-flops 41a through 41c, so that the shift register 41 does not perform shifting operations.

On the other hand, when the output of the decision circuit 37 (receiving signal) is at the high level at the detecting point B (light-emitting timing), the R-S flip-flop 43 is set, so that the inverting output terminal /Q of the R-S flip-flop 43 turns to be at the low level and the output terminal Q of the R-S flip-flop 43 turns to be at the high level. Here, the R-S flip-flop 44 is reset so that the inverting output terminal /Q of the R-S flip-flop 44 turns to be at the high level. As a result, the input terminals of the NAND gate 50 respectively receive the low-level signal from the R-S flip-flop 43 and the high-level signal from the R-S flip-flop 44. Consequently, the output terminal of the NAND gate 50 outputs a high-level signal to the input terminal of the AND gate 45.

Since the output terminal Q of the R-S flip-flop 43 is at the high level, the output of the NAND gate 49 turns to be at the low level. As a result, the low-level signal is supplied to the input terminal of the AND gate 46. Here, when the inverting output terminal /Q2 of the D flip-flop 41c in the shift register 41 outputs the low-level signal, the output of the AND gate 45 turns to be at the high level. Accordingly, the high-level signal is supplied to the respective set input terminals of the D flip-flops 41a through 41c of the shift register 41, so as to set all bits of the D flip-flops 41a through 41c to be at the high level.

In contrast, when the output of the decision circuit 37 (receiving signal) is at the low level at the detecting point B (light-emitting timing), the R-S flip-flops 43 and 44 are reset, so that the inverting output terminals /Q of the R-S flip-flops 43 and 44 turn to be at the high level. As a result, the output (low level) of the NAND gate 50 is supplied to the input terminal of the AND gate 45, so as to turn the output of the AND gate 45 to be at the low level. Here, the output terminal of the AND gate 49 supplies the high-level signal to the input terminal of the AND gate 46.

Under this condition, when the inverting output terminal /Q2 of the D flip-flop 41c in the shift register 41 continues to output the low-level signal, the output of the AND gate 46 turns to be at the low level, and the NAND gate 47 supplies the clock pulse to the respective clock input terminals CLK0 through CLK2 of the D flip-flops 41a through 41c. As a result, the low-level signal is respectively supplied to the set input terminals and the reset input terminals of the shift register 41, so that the shift register 41 performs shifting operations. Namely, in synchronism with the clock pulse, the data are shifted per bit at the respective input terminals of the D flip-flops 41a through 41c. When the output of the decision circuit 37 (receiving signal) continues to be at the low level for the number of cascade stages of the D flip-flop in the shift register 41, the output of the shift register 41 (the signal of the output terminal Q2 of the D flip-flop 41c) is inverted.

On the other hand, when the inverting output terminal /Q2 of the D flip-flop 41c in the shift register 41 outputs the high-level signal under the above-described condition wherein the output of the decision circuit 37 (receiving signal) is at the low level at the detecting point B (light-emitting timing), the R-S flip-flops 43 and 44 are reset. Accordingly, the output terminals Q of the R-S flip-flops 43 and 44 respectively output the low-level signal, and the inverting output terminals /Q of the R-S flip-flops 43 and 44 respectively output the high-level signal.

As a result, the low-level signal from the R-S flip-flop 43 and the high-level signal from the R-S flip-flop 44 are respectively supplied to the input terminals of the NAND gate 49. Consequently, the output terminal of the NAND gate 49 supplies the high-level signal to the AND gate 46. Further, in this case, the inverting output terminal /Q2 of the D flip-flop 41c outputs the high-level signal, so that this high-level signal and the high-level signal from the output terminal of the NAND gate 49 are respectively supplied to the input terminals of the AND gate 46. As described above, the output terminal of the AND gate 46 supplies the high-level signal to the respective reset terminals of the D flip-flops 41a through 41c while the clock pulse is at the high level, so that the D flip-flops 41a through 41c are respectively reset. In other words, all bits of the shift register 41 are reset, so that the output terminals Q0 through Q2 of the D flip-flops 41a through 41c respectively output the low-level signal.

However, in this case, when the output of the decision circuit 37 (receiving signal) at the detecting point B is at the low level, the output terminals of the AND gates 45 and 46 output the low-level signal to the respective set input terminals (S0 through S2) of the D flip-flops 41a through 41c and to the respective reset input terminals (R0 through R2) of the D flip-flops 41a through 41c, respectively. This allows the shift register 41 to perform shifting operations, so that the signals are respectively shifted per bit at the respective output terminals (Q0 through Q2) of the D flip-flops 41a through 41c in synchronism with the clock pulse. When this state continues for the number of cascade stages of the D flip-flop that compose the shift register 41 (three stages in FIG. 5), the output terminal Q2 of the D flip-flop 41c is inverted from the low level to the high level.

Figure 6:
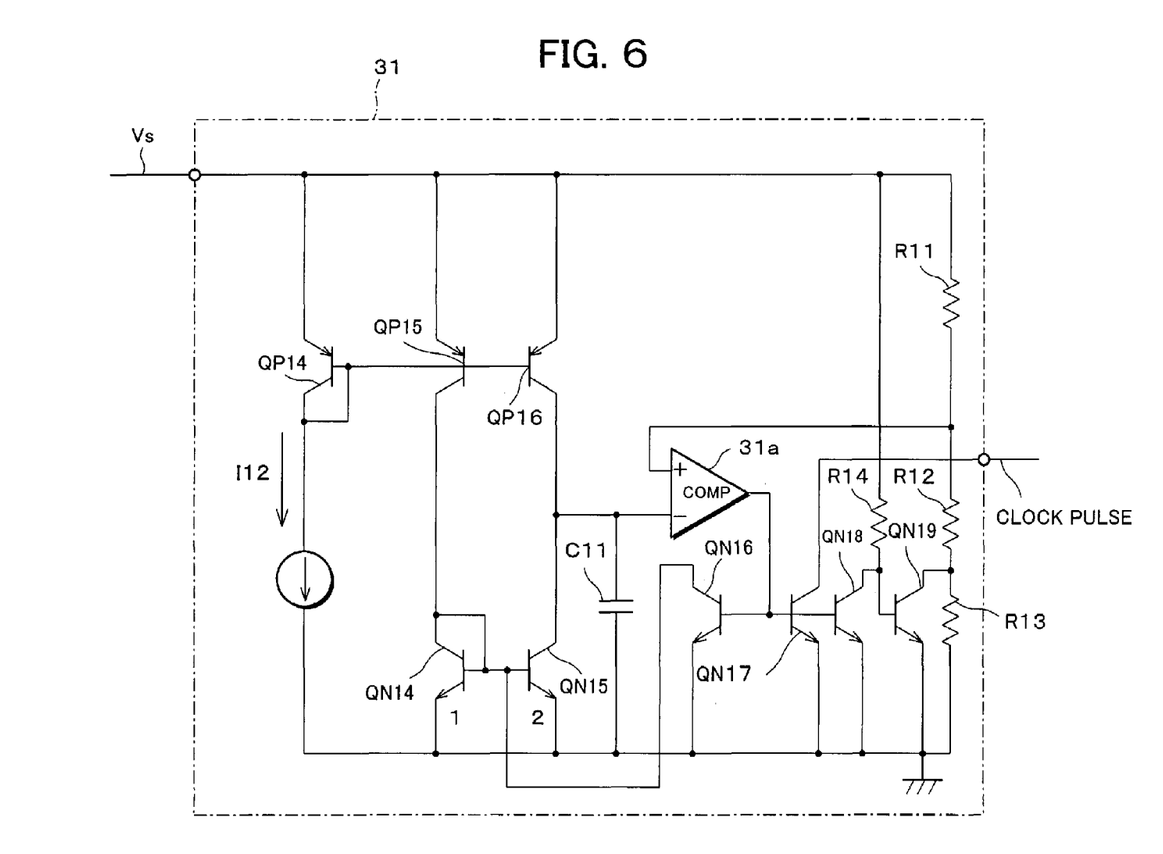
FIG. 6 is a circuit diagram showing an example of an arrangement of an oscillation circuit of the conventional photo-detecting device.

As shown in FIG. 6, in the oscillation circuit 31, while the condenser C11 is not charged, [a potential of an inverting input terminal] is smaller than [a potential of a non-inverting input terminal] at a comparator 31a, so that the comparator 31a outputs a high-level signal. Consequently, transistors QN16, QN17, and QN18 are switched ON, so as to switch OFF transistors QN14 and QN15. Accordingly, the condenser C11 is charged with constant current I12 which is supplied from a transistor QP16, so that the potential of the inverting input terminal of the comparator 31a increases. When the voltage of the inverting input terminal exceeds (V2+V3) (V2 and V3 indicate voltages at both ends of resistances R11 and R13, respectively), the output of the comparator 31a is inverted from the high level to a low level. Consequently, the transistors QN16, QN17, and QN18 are switched OFF, so as to switch ON the transistors QN14 and QN15. Accordingly, since an emitter area ratio of the transistors QN14 and QN15 is set as 1:2, the transistor QN15 respectively extracts I12 from the transistor QP16 and from the condenser C1. Namely, when the potential of the inverting input terminal of the comparator 31a becomes lower than the potential of the non-inverting input terminal of the comparator 31a (=V2+Vsat (QN19), where Vsat (QN19) is a saturation voltage of the transistor QN19 whose value is not more than 0.1 [V]), the output of the comparator 31a is inverted again from the low level to the high level so as to charge the condenser C11. By repeating the above-described operations, the oscillation circuit oscillates with a cycle wherein the condenser C11 is charged and discharged.

According to the above-described conventional technique, however, the detection signal from the light-receiving element 35 is processed in synchronism with the pulse-modulated light emitted from the light-emitting element 34. Accordingly, while the light-emitting element 34 does not emit light, the detection signal from the light-receiving element 35 is not demodulated with the synchronizing signal, but is discarded.

While the light-emitting element 34 does not emit the pulse-modulated light, when noise occurs or disturbance light enters the light-receiving element 35 in synchronism with the synchronizing signal, even the demodulation with the synchronizing signal cannot completely eliminate the disturbance light and the noise. This may cause the light-receiving element 35 to misjudge that the pulse-modulated light that is emitted from the light-emitting element 34 is entering the light-receiving element 35, thereby resulting in faulty operation.

More specifically, the detecting point A (light-emitting timing) is prepared for detecting disturbance light noise. In case where light enters in synchronism with timing other than the pulse-modulated frequency (non-light-emitting timing), the R-S flip-flop 44 is set when the output of the decision circuit 37 (light-receiving signal) is at the high level at the detecting point A, so that the inverting output terminal /Q outputs a low-level signal. This switches OFF the AND gate 47 so as not to supply the clock pulse to the shift register 41.

While the light-emitting element 34 does not emit pulse-modulated light, however, when the light that corresponds to not less than the number of stages of the shift register 41 enters the light-receiving element 35 for some reason (accidentally or intentionally) in synchronism with the timing of the pulse-modulated frequency (light-emitting timing), the inverting output terminal (/Q2) at the last stage of the shift register 41 is inverted, thereby resulting in faulty detection.

SUMMARY OF THE INVENTION

The object of the present invention is to provide a light-detecting method and a light-detecting device, capable of preventing a faulty operation even when disturbance light or noise enters a light-receiving element in synchronism with a synchronizing signal in a state without pulse-modulated light.

In order to attain the foregoing object, a photo-detecting method of the present invention is characterized by including the steps of (1) projecting pulse-modulated light toward an object; and (2) counting a synchronizing light-receiving signal, which is converted from either reflected light reflected from the object or transmitted light transmitted through the object, plurality of times in synchronism with a modulation frequency of the pulse-modulated light projected toward the object, so as to detect the object, wherein the modulation frequency of the pulse-modulated light projected toward the object is changed while carrying out the step of counting the light-receiving signal plurality of times.

With the method, the pulse-modulated light is projected toward the object, and the reflected light reflected from the object or the transmitted light transmitted through the object is converted into the light-receiving signal. The light-receiving signal is counted the plurality of times in synchronism with the modulation frequency of the projected light, so that the object is detected in accordance with the result of counting.

However, when disturbance light or noise having the same frequency as the pulse-modulated light is converted into the light-receiving signal for some reason, this light-receiving signal is processed as a normal light-receiving signal with respect to the pulse-modulated light, thereby resulting in faulty detection of the object.

Thus, with the above-described photo-detecting method, the modulation frequency of the light that is projected toward the object is changed while counting the light-receiving signal the plurality of times. With this arrangement, even when the abnormal light-receiving signal is counted for some reason while the normal light-receiving signal does not exist as described above, the modulation frequency of the light that is projected toward the object is changed during the counting. Accordingly, the abnormal light-receiving signal is no longer in synchronism with the changed modulation frequency, thereby turning off the counting operations. Consequently, even when the disturbance light or the noise is received while the light-receiving signal does not exist, the object can be detected with high precision, thereby preventing beforehand the faulty operation as occurred in the conventional technique.

Further, in order to attain the forgoing object, a photo-detecting device of the present invention is characterized by including (a) an oscillation circuit for outputting a plurality of signals having different oscillation frequencies, (b) a light-emitting section for projecting toward an object a light that is pulse-modulated in response to a signal from the oscillation circuit, (c) a light-receiving section for receiving either reflected light reflected from the object or transmitted light transmitted through the object, and for converting the received light into a light-receiving signal, (d) a counting section for counting the light-receiving signal a plurality of times in synchronism with a modulation frequency of the projected light, (e) a detecting section for detecting the object in response to the counting section, and (f) a frequency changing section for changing an oscillation frequency of the oscillation circuit while the counting section counts the light-receiving signal plurality of times.

According to the foregoing photo-detecting device, the pulse-modulated light that is pulse-modulated in response to the signal from the oscillation circuit is projected from the light-emitting section toward the object, and the reflected light reflected from the object or the transmitted light transmitted through the object is led to the light-receiving section so as to be converted into the light-receiving signal. The light-receiving signal is counted by the counting section the plurality of times in synchronism with the modulation frequency of the projected light, so that the object is detected by the detecting section in accordance with the result of counting.

However, when disturbance light or noise having the same frequency as the pulse-modulated light enters the light-receiving element for some reason either as the reflected light reflected from the object or as the transmitted light transmitted through the object, the disturbance light or the noise is converted into the light-receiving signal after being taken as the normal reflected light reflected from the object or the normal transmitted light. This light-receiving signal is processed as a normal light-receiving signal with respect to the pulse-modulated light, thereby resulting in faulty detection of the object.

Thus, with the foregoing above-described photo-detecting device, the oscillation frequency of the oscillation circuit is changed by the frequency changing section during the counting by the counting section. Accordingly, the modulation frequency of the light that is projected toward the object is changed while counting the light-receiving signal the plurality of times.

With this arrangement, even when the abnormal light-receiving signal is counted for some reason while the normal light-receiving signal does not exist as described above, the modulation frequency of the light that is projected toward the object is changed during the counting. Accordingly, the abnormal light-receiving signal is no longer in synchronism with the changed modulation frequency, thereby turning off the counting operations. Consequently, even when the disturbance light or the noise enters the light-receiving element while the light-receiving signal does not exist, the object can be detected with high precision, thereby preventing beforehand the faulty operation as occurred in the conventional technique.

For a fuller understanding of the nature and advantages of the invention, reference should be made to the ensuing detailed description taken in conjunction with the accompanying drawings.

DESCRIPTION OF THE EMBODIMENTS

Figure 1:
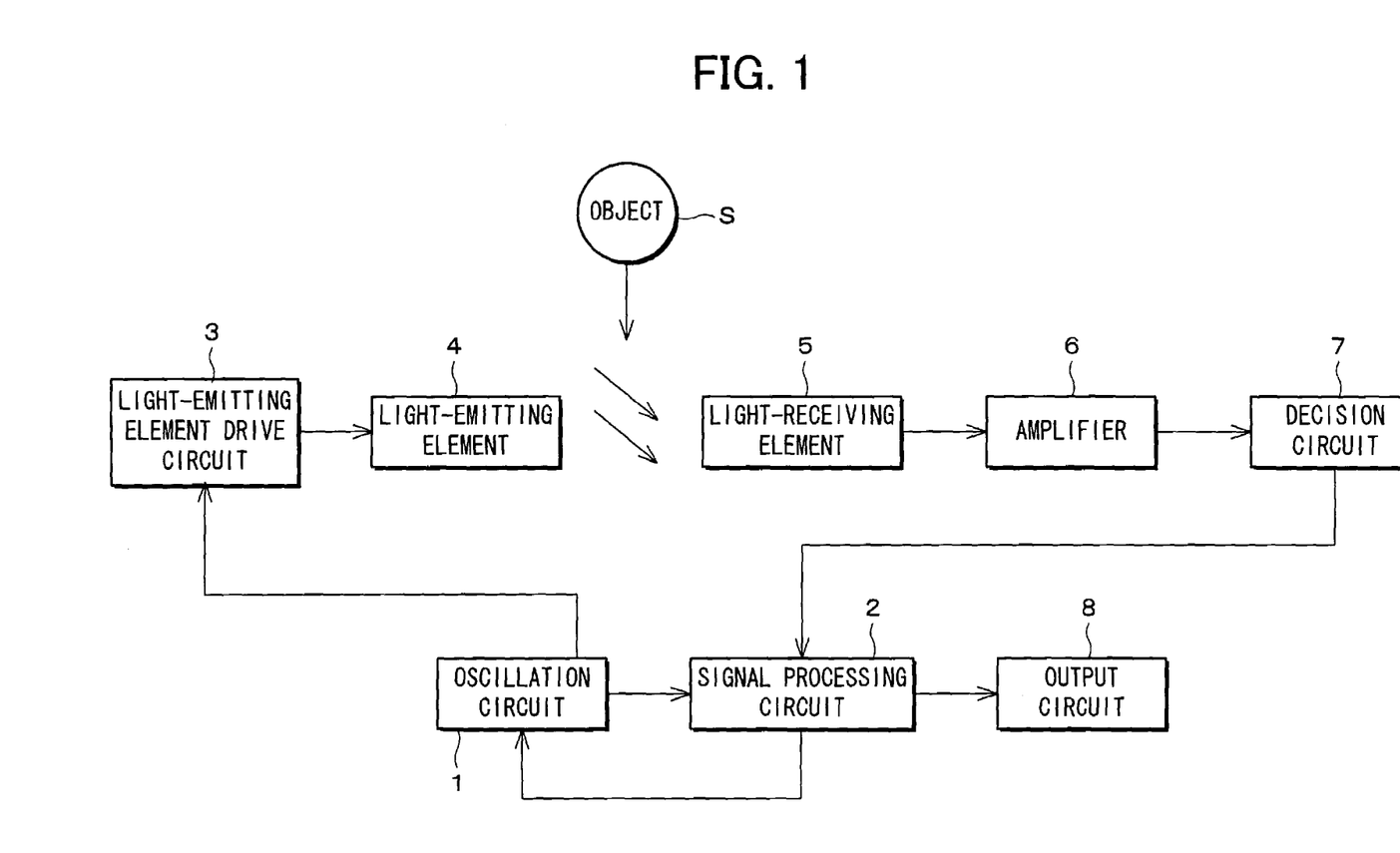
FIG. 1 is a block diagram showing an example of an arrangement of a photo-detecting device of the present invention.
Figure 2:
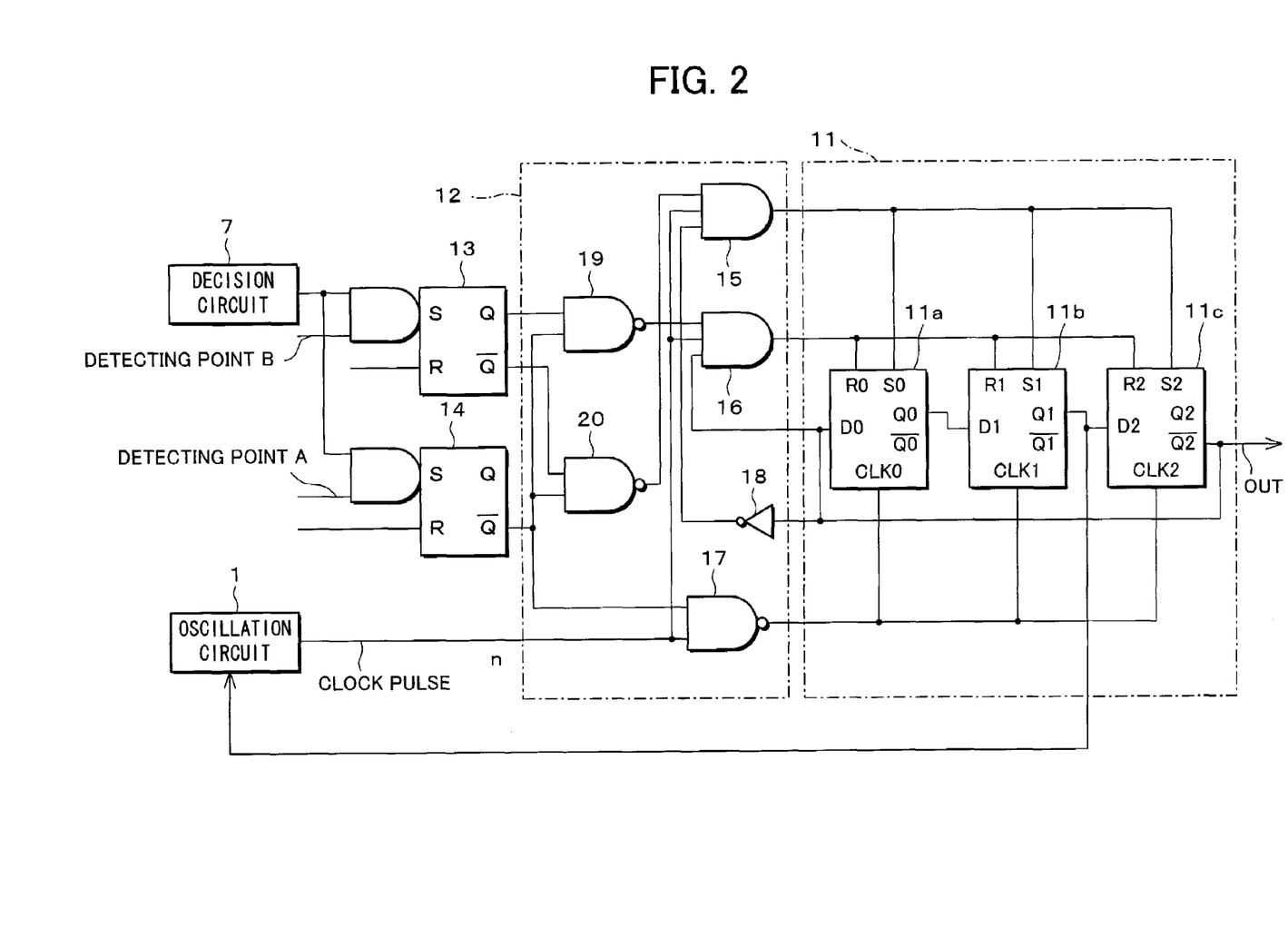
FIG. 2 is a circuit diagram showing an example of an arrangement of a signal processing circuit of the photo-detecting device.
Figure 3:
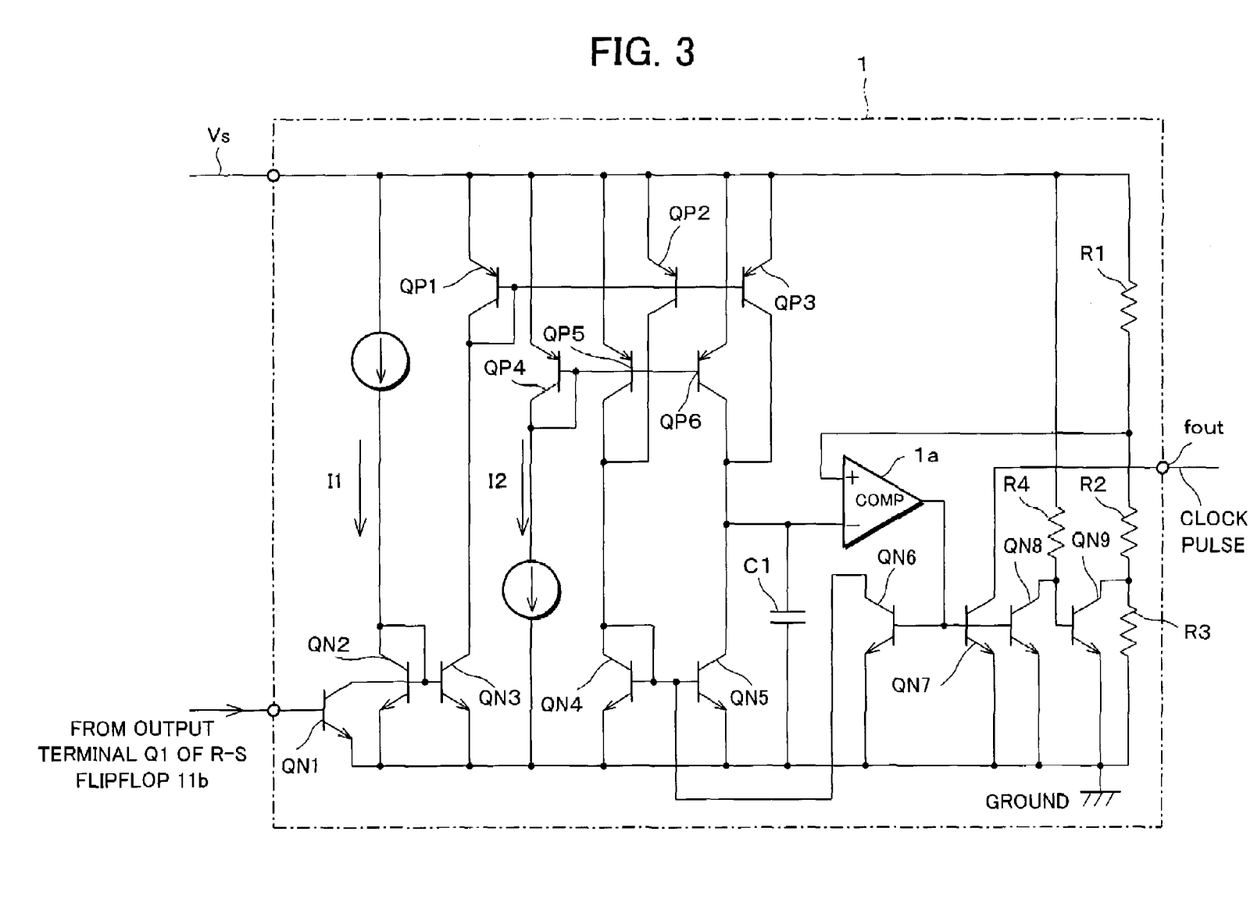
FIG. 3 is a circuit diagram showing an example of an arrangement of an oscillation circuit of the photo-detecting device.

The following will explain an embodiment of the present invention with reference to FIGS. 1 through 3.

A photo-detecting device of the present invention detects an object by (1) projecting light from a light-emitting element in synchronism with a pulse signal, and (2) counting at a plurality of times a light-receiving signal sent from the light-receiving element, which is a resultant of either reflected light reflected from a detection object or transmitted light transmitted through the detection object.

First, with reference to FIGS. 1 and 2, an overall arrangement of the photo-detecting device will be schematically explained. As shown in FIG. 1, a light-emitting element (light-emitting means) 4 is driven to perform pulse-modulation through an oscillation circuit 1 and a light-emitting element drive circuit 3. The light-emitting element 4 projects pulse-modulated pulse light toward an object S that exists in a detection area (not shown).

The pulse-modulated pulse light is transmitted through or is reflected from the object S that passes through the detection area provided between the light-emitting element 4 and a light-receiving element (light-receiving means) 5, so as to enter the light-receiving element 5. In other words, the pulse light for entering the light-receiving element 5 is set ON and OFF in response to the passage of the object S.

An optical signal, which is an output of the light-receiving element 5, is subjected to amplification and waveform shaping by an amplifier 6, and is then sent to a decision circuit 7. Functioning as a kind of comparator, the decision circuit 7 outputs a high-level signal if a signal level of the optical signal (light-receiving signal), which has subjected to amplification and waveform shaping by the amplifier 6, is higher than a certain threshold level, whereas the decision circuit 7 outputs a low-level signal if the signal level is not higher than the threshold level. The output of the decision circuit 7 is sent to a signal processing circuit 2. Note that, the decision circuit 7 also judges whether the pulse-modulated synchronizing signal, disturbance light, and noise are higher than the threshold level, and consequently outputs the high-level signal if the level is higher than the threshold level, and outputs the low-level signal if the level is not higher than the threshold level.

Further, an output signal of the signal processing circuit 2 (an output signal of an inverting output terminal /Q2 of a D flip-flop 11c as later described) is sent to an output circuit 8. In response to the output signal of the signal processing circuit 2, the output circuit 8 outputs a high-level or low-level signal in order to achieve output current or output voltage as electrical characteristics of the photo-detecting device. Note that, the output circuit 8 may be set to respectively output high-level and low-level output signals, or low-level and high-level output signals, in response to the respective high-level and low-level output signals from the signal processing circuit 2.

As shown in FIG. 2, the signal processing circuit 2 is composed of (a) R-S flip-flops 13 and 14, respectively attached with a timing gate, for capturing data at output detecting points A and B of the decision circuit 7 and for holding the data (hereinafter simply referred to as R-S flip-flops 13 and 14), (b) a shift register 11 (counting means, frequency changing means), which is arranged to feedback an inversion signal from serial output to serial input so as to shift the supplied input data in accordance with clock pulse having a predetermined cycle, and (c) a state detecting circuit 12.

The state detecting circuit 12 is composed of (a) AND gates 15 and 16 for controlling the shift register 11 to be set and reset in response to (1) output of the shift register 11 (the output signal from the inverting output terminal /Q2 of the D flip-flop 11c as later described), (2) the clock pulse, and (3) the signal from output terminals (Q, /Q) of the R-S flip-flop 13 which holds the data captured at the detecting point B, (b) an NAND gate 17, supplied with (1) the output of the R-S flip-flop 14 which holds the data captured at the detecting point A and (2) the clock pulse, for controlling supply of the clock pulse into the shift register 11, (c) an inverter gate 18, and (d) NAND gates 19 and 20 for controlling the AND gates 15 and 16.

Further, in the shift register 11, among a plurality of D flip-flops 11a through 11c (respectively including a data input terminal and a clock input terminal) which are connected in serial (in a cascade manner), an output of a middle stage of the D flip-flops 11a through 11c (a D flip-flop 11b) is connected to the oscillation circuit 1.

More specifically, an output terminal Q0 of the D flip-flop 11a is connected to a data input terminal D1 of the D flip-flop 11b, and an output terminal Q1 of the D flip-flop 11b is connected to a data input terminal D2 of the D flip-flop 11c.

The inverting output terminal /Q2 of the D flip-flop 11c is connected to a data input terminal D0 of the D flip-flop 11a. Further, reset terminals R0 through R2 of the D flip-flops 11a through 11c are respectively connected to an output terminal of the AND gate 16 as later described. Set terminals S0 through S2 of the D flip-flops 11a through 11c are respectively connected to an output terminal of the AND gate 15 as later described. Clock input terminals CLK0 through CLK2 of the D flip-flops 11a through 11c are respectively connected to an output terminal of the NAND gate 17 as later described.

The output signal of the inverting output terminal /Q2 of the D flip-flop 11c is sent to an input terminal (first input terminal) of the AND gate 15 via the inverter gate 18. The inverting output terminal /Q2 of the D flip-flop 11c is also connected to an input terminal (first input terminal) of the AND gate 16. The clock pulse is respectively supplied to input terminals (second input terminals) of the AND gates 15 and 16. An output terminal of the NAND gate 19 is connected to the remaining input terminal (third input terminal) of the AND gate 16, whereas an output terminal of the NAND gate 20 is connected to the remaining input terminal (third input terminal) of the AND gate 15.

An input terminal of the NAND gate 17 is applied with the clock pulse that varies in accordance with the output of the oscillation circuit 1. Another input terminal of the NAND gate 17 is connected to the inverting output terminal /Q of the R-S flip-flop 14.

The NAND gate 20 has one input terminal connected to the inverting output terminal /Q of the R-S flip-flop 14, and another input terminal connected to the inverting output terminal /Q of the R-S flip-flop 13. Further, the NAND gate 19 has one input terminal connected to the output terminal Q of the R-S flip-flop 13, and another input terminal connected to the inverting output terminal /Q of the R-S flip-flop 14.

In the present embodiment, the output of the D flip-flop 11b in the shift register 11 is sent to the oscillation circuit 1 via the output terminal Q1 (see FIG. 3).

According to the above-described circuit configuration, when the output of the decision circuit 7 (receiving signal) is at the high level at the detecting point A (non-light-emitting timing) (i.e., the disturbance light noise exists), the R-S flip-flop 14 is set, so that the inverting output terminal /Q of the R-S flip-flop 14 constantly supplies a low-level signal to the input terminal of the NAND gate 17. Accordingly, irrespectively of the clock pulse, the output terminal of the NAND gate 17 constantly supplies a high-level signal to the respective clock input terminals CLK0 through CLK2 of the D flip-flops 11a through 11c, so that the shift register 11 does not perform shifting operations.

On the other hand, when the output of the decision circuit 7 (receiving signal) is at the high level at the detecting point B (light-emitting timing), the R-S flip-flop 13 is set, so that the inverting output terminal /Q of the R-S flip-flop 13 turns to be at the low level, and the output terminal Q of the R-S flip-flop 13 turns to be at the high level. Here, the R-S flip-flop 14 is reset so that the inverting output terminal /Q of the R-S flip-flop 14 turns to be at the high level. As a result, the input terminals of the NAND gate 20 respectively receive the low-level signal from the R-S flip-flop 13 and the high-level signal from the R-S flip-flop 14. Consequently, the output terminal of the NAND gate 20 outputs a high-level signal to the input terminal of the AND gate 15.

Since the output terminal Q of the R-S flip-flop 13 is at the high level, the output of the NAND gate 19 turns to be at the low level. As a result, the low-level signal is supplied to the input terminal of the AND gate 16. Here, when the inverting output terminal /Q2 of the D flip-flop 11c in the shift register 11 outputs the low-level signal, the output of the AND gate 15 turns to be at the high level. Accordingly, the high-level signal is supplied to the respective set input terminals of the D flip-flops 11a through 11c of the shift register 11, so as to set all bits of the D flip-flops 11a through 11c to be at the high level.

In contrast, when the output of the decision circuit 7 (receiving signal) is at the low level at the detecting point B (light-emitting timing), the R-S flip-flops 13 and 14 are reset, so that the inverting output terminals /Q of the R-S flip-flops 13 and 14 turn to be at the high level. As a result, the output (low level) of the NAND gate 20 is supplied to the input terminal of the AND gate 15, so as to turn the output of the AND gate 15 to be at the low level. Here, the output terminal of the AND gate 19 supplies the high-level signal to the input terminal of the AND gate 16.

Under this condition, when the inverting output terminal /Q2 of the D flip-flop 11c in the shift register 11 continues to output the low-level signal, the output of the AND gate 16 turns to be at the low level, and the NAND gate 17 supplies the clock pulse to the respective clock input terminals CLK0 through CLK2 of the D flip-flops 11a through 11c.

As a result, the low-level signal is respectively supplied to the set input terminals and the reset input terminals of the shift register 11, so that the shift register 11 performs shifting operations in synchronism with the clock pulse. Namely, in synchronism with the clock pulse, the data are shifted per bit at respective input terminals of the D flip-flops 11a through 11c.

When the output of the decision circuit 7 (receiving signal) continues to be at the low level for the number of stages of the D flip-flop in the shift register 11, the output of the shift register 11 (the signal of the output terminal Q2 of the D flip-flop 11c) is inverted.

On the other hand, under the above-described condition wherein the output of the decision circuit 7 (receiving signal) is at the low level at the detecting point B (light-emitting timing), when the inverting output terminal /Q2 of the D flip-flop 11c in the shift register 11 outputs the high-level signal, the R-S flip-flops 13 and 14 are reset because the output of the decision circuit 7 (receiving signal) is at the low level at the detecting point B (light-emitting timing). Accordingly, the output terminals Q of the R-S flip-flops 13 and 14 respectively output the low-level signal, and the inverting output terminals /Q of the R-S flip-flops 13 and 14 respectively output the high-level signal.

As a result, the low-level signal from the R-S flip-flop 13 and the high-level signal from the R-S flip-flop 14 are respectively supplied to the input terminals of the NAND gate 19. Consequently, the output terminal of the NAND gate 19 supplies the high-level signal to the AND gate 16. Further, in this case, the inverting output terminal /Q2 of the D flip-flop 11c outputs the high-level signal, so that this high-level signal and the high-level signal from the output terminal of the NAND gate 19 are respectively supplied to the input terminals of the AND gate 16. As described above, the output terminal of the AND gate 16 supplies the high-level signal to the respective reset terminals of the D flip-flops 11a through 11c while the clock pulse is at the high level, so that the D flip-flops 11a through 11c are respectively reset. In other words, all bits of the shift register 11 are reset, so that the output terminals Q0 through Q2 of the D flip-flops 11a through 11c respectively output the low-level signal.

However, in this case, when the output of the decision circuit 7 (receiving signal) at the detecting point B is at the low level, the output terminals of the AND gates 15 and 16 output the low-level signal to the respective set input terminals (S0 through S2) of the D flip-flops 11a through 11c and to the respective reset input terminals (R0 through R2) of the D flip-flops 11a through 11c, respectively. This allows the shift register 11 to perform shifting operations, so that the signals are respectively shifted per bit at the respective output terminals (Q0 through Q2) of the D flip-flops 11a through 11c in synchronism with the clock pulse. When this state continues for the number of cascade stages of the D flip-flop that compose the shift register 11 (three stages in FIG. 2), the output terminal Q2 of the D flip-flop 11c is inverted from the low level to the high level. Further, the output terminal Q1 of the D flip-flop 11b is inverted from the low level to the high level when the shift register 11 continues to perform the shifting operations in synchronism with the clock pulse for a period of two stages of the D flip-flop (for a period of two clock pulse cycles).

Incidentally, an output terminal of a middle stage of the D flip-flops that are provided in a plurality of stages in the shift register 11 (the output terminal Q1 of the D flip-flop 11b in FIG. 2) is connected to the oscillation circuit 1 as described above (see FIG. 3). Here, the oscillation circuit 1 will be explained with reference to FIG. 3.

The oscillation circuit 1 is provided with a plurality of constant current sources for charging and discharging a condenser C1, as shown in FIG. 3. The oscillation circuit 1 respectively turns ON and OFF the plurality of constant current sources in response to the output state of the shift register 11, so as to selectively switch a plurality of oscillation frequencies.

Note that, for ease of explanation, it is assumed here that the D flip-flops for composing the shift register 11 are provided in three cascade stages. In other words, with reference to FIG. 3, the following will explain the case where (a) the output terminal Q1 of the D flip-flop 11b at the second stage is connected to a base of a transistor QN1 in the oscillation circuit 1, and (b) two constant current sources (two constant current sources which output constant current I1 and I2, respectively) are provided in the oscillation circuit 1. Note that, the present invention is not limited to the above arrangement where the D flip-flops are provided in the above number of cascade stages, but can be applied to an arrangement where the D flip-flops for composing the shift register 11 are provided in four or more cascade stages.

In the oscillation circuit 1, as shown in FIG. 3, the condenser C1 is provided between an inverting input terminal of a comparator 1a and ground. A non-inverting input terminal of the comparator 1a is connected to a connection point of resistances R1 and R2 among resistances R1, R2, and R3 that are connected in series in this order between a constant voltage Vs and the ground. An output terminal of the comparator 1a is respectively connected to bases of transistors QN6, QN7, and QN8, so as to respectively switch ON and OFF these transistors QN6, QN7, and QN8.

While the condenser C1 is not charged, a voltage of the inverting input terminal of the comparator 1a is smaller than a voltage of the connection point of the resistances R1 and R2, so that the output terminal of the comparator 1a outputs a high-level signal. Consequently, the transistor QN8 is switched ON, so as to switch OFF a transistor QN9. Accordingly, the non-inverting input terminal of the comparator 1a receives a voltage of maximum value Vmax (Vmax={(R2+R3)×Vs}/(R1+R2+R3)), where Vs is the constant voltage in the oscillation circuit 1.

The condenser C1 is charged with constant current (I1+I2) or the constant current I2, until the voltage of the inverting input terminal reaches the Vmax, as later described. When the voltage of the inverting input terminal exceeds the Vmax, the output terminal of the comparator 1a outputs a low-level signal.

Consequently, the transistor QN8 is switched OFF, so as to switch ON the transistor QN9. Accordingly, the non-inverting input terminal of the comparator 1a receives a voltage of minimum value Vmin (Vmin={(R2×Vs)/(R1+R2+R3)+Vsat (QN9)}), where Vsat (QN9) is a saturation voltage of the transistor QN9 whose value is not more than 0.1 [V].

Further, since the output of the comparator 1a is at the low level, the transistor QN6 is switched OFF, so as to respectively switch ON transistors QN4 and QN5 which compose a current mirror circuit with respect to each other. Accordingly, with the constant current (I1+I2) or I2, the transistor QN5 extracts (a) the constant current (I1+I2) or I2 which is sent from transistors QP3 and QP6 and (b) the electric charges charged in the condenser C1, until the voltage of the non-inverting input terminal reaches Vmin. With the above-described operations, an oscillation frequency f0 of the oscillation circuit 1 is expressed as: f0=(I1+I2)/{2×C1×(Vmax−Vmin)}. Note that, in the present embodiment, an emitter area ratio of the transistors QN4 and QN5 is set as 1:2.

When the output terminal Q1 of the D flip-flop 11b in the shift register 11 supplies the low-level signal to the base of the transistor QN1 in the oscillation circuit 1, the transistor QN1 is switched OFF, so that the constant current I1 flows into a transistor QN2. Consequently, the constant current I1 flows into a transistor QN3 which composes a current mirror circuit with respect to the transistor QN2, and the constant current I1 flows through transistors QP1 through QP3 which compose a current mirror circuit with respect to one another. Further, the constant current I2 constantly flows through transistors QP4 through QP6 which compose a current mirror circuit with respect to one another, so that the condenser C1 is charged and discharged with the constant current (I1+I2).

In contrast, when the output terminal Q1 of the D flip-flop 11b in the shift register 11 supplies the high-level signal to the base of the transistor QN1 in the oscillation circuit 1, the transistor QN1 is switched ON, so that the constant current I1 flows through the transistor QN1.

Consequently, the transistors QN2 and QN3 are switched OFF, so as to switch OFF the transistors QP1 through QP3 which compose the current mirror circuit with respect to one another. On the other hand, the constant current I2 constantly flows through the transistors QP4 through QP6 which compose the current mirror circuit with respect to one another, so that the condenser C1 is charged and discharged only with the constant current I2.

As described above, in accordance with the constant current for charging and discharging the condenser C1, the oscillation frequency of the signal, which is outputted from an output terminal (fout) that is drawn from a collector of the transistor QN7, is changed.

Specifically, when the output terminal Q1 of the D flip-flop 11b in the shift register 11 supplies the high-level signal to the base of the transistor QN1 in the oscillation circuit 1, the oscillation frequency of the oscillation circuit 1 becomes smaller (lower); on the other hand, when the low-level signal is supplied to the base of the transistor QN1 in the oscillation circuit 1, the oscillation frequency of the oscillation circuit 1 becomes larger (higher).

When the oscillation frequency of the oscillation circuit 1 becomes higher, a modulation rate of the pulse-modulated pulse light projected from the light-emitting element 4 increases. Further, when the oscillation frequency of the oscillation circuit 1 becomes higher, the clock timing of the shift register 11 also increases. Thus, when an incident or hidden signal (mixed signal) continues to be supplied to the shift register 11 in synchronism with the increased modulation rate, the signal, which is outputted from the output terminal Q2 (and the inverting output terminal /Q2) of the D flip-flop 11c in the shift register 11, is inverted.

As described above, in the oscillation circuit 1, as shown in FIG. 3, the condenser C1 is charged with the constant current so that the voltages increase at the both ends of the condenser C1. When the voltage exceeds the Vmax, the output of the comparator 1a is inverted so as to gradually lower the voltage of the condenser C1; whereas, when the voltage falls below the Vmin, the output of the comparator 1a is inverted again so as to charge the condenser C1. By repeating the above-described operations, the oscillation circuit oscillates with a cycle wherein the condenser C1 is charged and discharged. Further, the cycle is switched during the shifting operations in the shift register 11 (i.e., while counting the light-receiving signal a plurality of times).

Even when the disturbance light enters the light-receiving element 5 in synchronism with the pulse-modulated light from the light-emitting element 4 for the period of not less than the number of stages of the shift register 11 while the light-emitting element 4 does not emit the pulse-modulated light, the modulation frequency of the pulse-modulated light from the light-emitting element 4 is changed during the counting (during the shifting operations of the shift register 11). Accordingly, the disturbance light in synchronism with the previous pulse-modulated light is no longer in synchronism with the changed modulation frequency, thereby turning off the counting operations. Further, the modulation frequency of the pulse-modulated light from the light-emitting element 4 is changed before the shift register 11 continues to perform the shifting operations for the number of stages of the shift register 11 (before the output signal from the inverting output terminal /Q2 of the D flip-flop 11c is inverted in the conventional technique). This can prevent the faulty operation as occurred in the conventional technique caused by the inversion of the output signal from the inverting output terminal /Q2 of the D flip-flop 11c.

Incidentally, when changing the oscillation frequency of the oscillation circuit 1, the oscillation frequencies must be set in a manner such that any one of oscillation frequencies is not an integer multiple of another oscillation frequency. This is because of a following reason: namely, if one of the oscillation frequencies is an integer multiple of another oscillation frequency, when disturbance light having the same frequency as the higher oscillation frequency enters the light-receiving element 5 for some reason (accidentally or intentionally), the disturbance light in synchronism with the higher oscillation frequency is still in synchronism with the lower oscillation frequency even after switching the oscillation frequencies into the lower oscillation frequency.

The above explanation dealt with the case where the oscillation frequencies of the oscillation circuit 1 are selectively switched in accordance with the signal supplied from the output terminal Q1 of the D flip-flop 11b in the shift register 11, but the present invention is not limited to this arrangement. Namely, the oscillation frequencies of the oscillation circuit 1 may be selectively switched in accordance with the signal supplied from the inverting output terminal /Q1 of the D flip-flop 11b in the shift register 11. In this case, the relation of the higher and lower oscillation frequencies is opposite from that in the above-explained case.

Further, the above explanation dealt with the case where one output, which is taken out from the shift register 11, turns ON and OFF one of the constant current in the oscillation circuit 1 so as to generate two kinds of the oscillation frequencies (clock pulse), but the present invention is not limited to this arrangement. Namely, signals may be taken out from two or more output terminals among output terminals of four or more D flip-flops (except the one at a last stage) which are connected in series, and three or more constant current sources may be provided in the oscillation circuit 1. With this arrangement, three or more oscillation frequencies can be generated in the oscillation circuit 1, so that the oscillation frequencies can be appropriately switched in accordance with the output state of the shift register 11.

For example, signals may be respectively taken out from the output terminals of second and third stages of four D flip-flops which are connected in series, so as to be supplied to the oscillation circuit 1. In this case, by providing three constant current sources for determining the oscillation frequency at the oscillation circuit 1, and by turning ON and OFF the constant current in response to the output of the shift register 11, three oscillation frequencies can be appropriately selected. In this case, it is possible to surely prevent the faulty operation caused by the disturbance light noise, etc.

Further, the above explanation dealt with the case where the shift register 11 is composed of the D flip-flops 11a through 11c, but the present invention is not limited to this arrangement. Namely, other synchronous flip-flops (flip-flops using the clock pulse), such as a JK flip-flop, an RST flip-flop, etc., may be used instead of the respective D flip-flops 11a through 11c.

As described above, according to the present invention, it is possible to provide a photo-detecting device for detecting an object with high precision without faulty detection, in a following manner. Namely, when light enters in synchronism with the pulse-modulated frequency timing (light-emitting timing) for the period of not less than the number of stages of the shift register 11 for some reason (accidentally or intentionally) while the light-receiving signal does not exist, the oscillation frequencies are selectively switched after the synchronization, thereby changing the clock timing of the signal processing circuit 2.

As described above, a photo-detecting method of the present invention is characterized by including the steps of (1) projecting pulse-modulated light toward an object; and (2) counting a synchronizing light-receiving signal, which is converted from either reflected light reflected from the object or transmitted light transmitted through the object, plurality of times in synchronism with a modulation frequency of the pulse-modulated light projected toward the object, so as to detect the object, wherein the modulation frequency of the pulse-modulated light projected toward the object is changed while carrying out the step of counting the light-receiving signal plurality of times.

With the method, the pulse-modulated light is projected toward the object, and the reflected light reflected from the object or the transmitted light transmitted through the object is converted into the light-receiving signal. The light-receiving signal is counted the plurality of times in synchronism with the modulation frequency of the projected light, so that the object is detected in accordance with the result of counting.

However, when disturbance light or noise having the same frequency as the pulse-modulated light is converted into the light-receiving signal for some reason, this light-receiving signal is processed as a normal light-receiving signal with respect to the pulse-modulated light, thereby resulting in faulty detection of the object.

Thus, with the above-described photo-detecting method, the modulation frequency of the light that is projected toward the object is changed while counting the light-receiving signal the plurality of times. With this arrangement, even when the abnormal light-receiving signal is counted for some reason while the normal light-receiving signal does not exist as described above, the modulation frequency of the light that is projected toward the object is changed during the counting. Accordingly, the abnormal light-receiving signal is no longer in synchronism with the changed modulation frequency, thereby turning off the counting operations. Consequently, even when the disturbance light or the noise is received while the light-receiving signal does not exist, the object can be detected with high precision, thereby preventing beforehand the faulty operation as occurred in the conventional technique.

A photo-detecting device of the present invention is characterized by including (a) an oscillation circuit for outputting a plurality of signals having different oscillation frequencies, (b) light-emitting means for projecting toward an object a light that is pulse-modulated in response to a signal from the oscillation circuit, (c) light-receiving means for receiving either reflected light reflected from the object or transmitted light transmitted through the object, and for converting the received light into a light-receiving signal, (d) counting means for counting the light-receiving signal a plurality of times in synchronism with a modulation frequency of the projected light, (e) detecting means for detecting the object in response to the counting means, and (f) frequency changing means for changing an oscillation frequency of the oscillation circuit while the counting means counts the light-receiving signal plurality of times.

With the photo-detecting device, the pulse-modulated light that is pulse-modulated in response to the signal from the oscillation circuit is projected from the light-emitting means toward the object, and the reflected light reflected from the object or the transmitted light transmitted through the object is led to the light-receiving means so as to be converted into the light-receiving signal. The light-receiving signal is counted by the counting means the plurality of times in synchronism with the modulation frequency of the projected light, so that the object is detected by the detecting means in accordance with the result of counting.

However, when disturbance light or noise having the same frequency as the pulse-modulated light enters the light-receiving element for some reason either as the reflected light reflected from the object or as the transmitted light transmitted through the object, the disturbance light or the noise is converted into the light-receiving signal after being taken as the normal reflected light reflected from the object or the normal transmitted light. This light-receiving signal is processed as a normal light-receiving signal with respect to the pulse-modulated light, thereby resulting in faulty detection of the object.

Thus, with the above-described photo-detecting device, the oscillation frequency of the oscillation circuit is changed by the frequency changing means during the counting by the counting means. Accordingly, the modulation frequency of the light that is projected toward the object is changed while counting the light-receiving signal the plurality of times.

With this arrangement, even when the abnormal light-receiving signal is counted for some reason while the normal light-receiving signal does not exist as described above, the modulation frequency of the light that is projected toward the object is changed during the counting. Accordingly, the abnormal light-receiving signal is no longer in synchronism with the changed modulation frequency, thereby turning off the counting operations. Consequently, even when the disturbance light or the noise enters the light-receiving element while the light-receiving signal does not exist, the object can be detected with high precision, thereby preventing beforehand the faulty operation as occurred in the conventional technique.

The photo-detecting device of the present invention is preferably arranged so that the counting means is a shift register in which a plurality of flip-flops are connected in a cascade manner, and the frequency changing means changes the oscillation frequency of the oscillation circuit in response to an output signal from at least one of the flip-flops except the one at a last stage (except those at first and last stages, more desirably).

With the arrangement, a simple structure that uses at least one of the flip-flops except the one at the last stage can easily realize a state wherein the oscillation frequency is changed during the counting by the counting means. With this arrangement, the synchronizing timing of the counting can be changed, so that even when noise light enters for the period of not less than the number of stages of the flip-flop, it is possible to surely prevent faulty detection, thereby detecting the object with high precision.

More specifically, Japanese Unexamined Patent Publication No. 6-187884/1994 (Tokukaihei 6-187884, published on Jul. 8, 1994) discloses an arrangement wherein an XNOR is set up with respect to a first stage and a last stage of the shift register having five stages. With this arrangement, a pulse frequency is changed when the output of the first stage and the output of the last stage are different. In other words, the frequency changing means decides whether to change the pulse frequency after judging whether (a) the noise does not exist by receiving five stages of synchronizing signals, or (b) the noise exists.

In contrast, in the arrangement of the present invention, in accordance with an output from at least one stage of the shift register except the last stage, the frequency changing means changes the oscillation frequency (pulse frequency) without judging whether the received signal is a normal synchronizing light-receiving signal or the noise. Here, the normal light-receiving signal can be distinguished from the noise, because the normal light-receiving signal is still in synchronism with the oscillation frequency even after the oscillation frequency is changed. Further, the signal is judged as the normal signal when the signal continues to be in synchronism with the oscillation frequency for the number of the stages of the shift register, thereby changing the output of the signal processing circuit.

When the oscillation frequency is changed in response to the output of the first stage, the oscillation frequency is changed soon after the signal is supplied to the shift register in synchronism with the pulse timing. When the oscillation frequency is changed in response to the output of the second stage, the oscillation frequency is changed after the signal is consecutively supplied twice to the shift register in synchronism with the pulse timing. Note that, the oscillation frequency is not changed in response to the output of the last stage, because the oscillation frequency may not be changed until the signal passes through the shift register in synchronism with the pulse timing. As described above, in the present invention, it is possible to change the oscillation frequency more easily.

Further, in the arrangement of Tokukaihei 6-187884, only two oscillation frequencies can be selected by using the output of the XNOR. On the other hand, in the present invention, as in a case where the oscillation frequency is changed in response to signals outputted from the first stage and the second stage of the shift register, for example, it is possible to select three or more oscillation frequencies.

Namely, the photo-detecting device of the present invention may be so arranged that the oscillation circuit outputs three or more signals having different oscillation frequencies, the counting means is a shift register in which four or more flip-flops are connected in a cascade manner, and the frequency changing means changes the oscillation frequencies of the three or more signals outputted from the oscillation circuit, in response to output signals from two or more flip-flops except the one at a last stage.

The photo-detecting device of the present invention is preferably arranged so that the oscillation circuit is provided with a plurality of constant current sources for charging and discharging a condenser, and the oscillation frequency is changed by controlling the plurality of constant current sources.

With the arrangement, by changing a period of time required for charging and discharging the condenser, the oscillation frequency can be changed. In other words, by controlling (turning ON and OFF, for example) the plurality of constant current sources, the period of time required for charging and discharging the condenser can be controlled. As described above, with the simple arrangement, it is possible to easily change the oscillation frequency.

Further, by providing the plurality of constant current sources, the variable number of the oscillation frequencies can be increased. Therefore, it is possible to respond to a wide variety of noise, thereby enabling photo-detection with higher precision.

The photo-detecting device of the present invention is preferably arranged so that the plurality of constant current sources of the oscillation circuit are provided in a same number as a number of variable oscillation frequencies.

With the arrangement, by providing the constant current sources in the same number as the variable number of the oscillation frequencies, the oscillation frequencies can be appropriately selected. Therefore, it is possible to surely respond to a wide variety of noise, thereby enabling photo-detection with higher precision.

The photo-detecting device of the present invention is preferably arranged so that the oscillation circuit changes the oscillation frequency so that any one of oscillation frequencies is not an integer multiple of another oscillation frequency.

When any one of oscillation frequencies is an integer multiple of another oscillation frequency, when disturbance light having the same frequency as the higher oscillation frequency enters the light-receiving element for some reason (accidentally or intentionally), the disturbance light in synchronism with the higher oscillation frequency is still in synchronism with the lower oscillation frequency even after switching the oscillation frequencies into the lower oscillation frequency.

Therefore, by changing the respective oscillation frequencies in a manner such that any one of oscillation frequencies is not an integer multiple of another oscillation frequency, it is possible to surely prevent the above problem.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A photo-detecting device, comprising:
   an oscillation circuit provided with a plurality of constant current sources for outputting a plurality of signals having different oscillation frequencies;
   light-emitting means for projecting toward an object a light that is pulse-modulated in response to a signal from said oscillation circuit;
   light-receiving means for receiving either light reflected from the object or light transmitted through the object, and for converting the received light into a light-receiving signal;
   counting means for counting the light-receiving signal a plurality of times in synchronism with a modulation frequency of the projected light;
   detecting means for detecting the object in response to said counting means; and
   frequency changing means for, in accordance with a count of the counting means, controlling the plurality of constant current sources to vary an oscillation frequency of said oscillation circuit in a determinable manner, while said counting means counts the light-receiving signal a plurality of times.

2. The photo-detecting device as set forth in claim 1, wherein:
   said counting means is a shift register in which a plurality of flip-flops are connected in a cascade manner; and
   said frequency changing means changes the oscillation frequency of said oscillation circuit in response to said output signal from at least one of the flip-flops except the flip-flop at a last stage.

3. The photo-detecting device as set forth in claim 2, wherein:
   said frequency changing means changes the oscillation frequency of said oscillation circuit when said output signal from one of the flip-flops changes.

4. The photo-detecting device as set forth in claim 2, wherein:
   said frequency changing means changes the oscillation frequencies of said oscillation circuit in response to said output signal from at least one of the flip-flops except the flip-flops at a first and last stage.

5. The photo-detecting device as set forth in claim 2, wherein:
   said oscillation circuit outputs three or more signals having different oscillation frequencies;
   said counting means is a shift register in which four or more flip-flops are connected in a cascade manner; and
   said frequency changing means changes the oscillation frequencies of said three or more signals outputted from said oscillation circuit, in response to output signals from two or more flip-flops except the flip-flop at a last stage.

6. The photo-detecting device as set forth in claim 1, wherein:
   said plurality of constant current sources of said oscillation circuit are provided in a same number as a number of variable oscillation frequencies.

7. The photo-detecting device as set forth in claim 1, wherein:
   said oscillation circuit changes the oscillation frequency so that any one of oscillation frequencies is not an integer multiple of another oscillation frequency.

8. A photo-detecting device, comprising:
   an oscillation circuit provided with a plurality of constant current sources for outputting a plurality of signals having different oscillation frequencies;
   light-emitting means for projecting toward an object a light that is pulse-modulated in response to a signal from said oscillation circuit;
   light-receiving means for receiving either light reflected from the object or light transmitted through the object, and for converting the received light into a light-receiving signal;
   counting means for counting the light-receiving signal a plurality of times in synchronism with a modulation frequency of the projected light;
   detecting means for detecting the object in response to said counting means; and
   frequency changing means for, in accordance with a count of the counting means, controlling the plurality of constant current sources to vary an oscillation frequency of said oscillation circuit dependent on a previously received light-receiving signal while said counting means counts the light-receiving signal a plurality of times.

9. The photo-detecting device as set forth in claim 1, wherein the oscillation circuit further comprises a condenser; and
   said frequency changing means controls which of the plurality of constant current sources charges and discharges the condenser.

* * * * *